United States Patent [19]
Klaus

[11] Patent Number: 5,916,602
[45] Date of Patent: Jun. 29, 1999

[54] INJECTION MOLDING MACHINE HAVING A HYDRAULICALLY OPERATED CLAMPING SYSTEM

[75] Inventor: M. Barr Klaus, Cincinnati, Ohio

[73] Assignee: Cincinnati Milacron Inc., Cincinnati, Ohio

[21] Appl. No.: 08/901,752

[22] Filed: Jul. 28, 1997

[51] Int. Cl.$^6$ ................................................ B29C 45/80
[52] U.S. Cl. ...................... 425/145; 264/40.5; 425/149; 425/589
[58] Field of Search ...................... 425/145, 149, 425/150, 589; 264/40.5

[56] References Cited

U.S. PATENT DOCUMENTS

| | | | |
|---|---|---|---|
| 5,338,174 | 8/1994 | Miese | 425/150 |
| 5,645,868 | 7/1997 | Reinhart | 425/145 |

*Primary Examiner*—Tim Heitbrink
*Attorney, Agent, or Firm*—Stephen H. Friskney

[57] ABSTRACT

An electro-mechanical drive apparatus uses a single variable speed motor, two one-way clutches, and a hydraulic accumulator to provide both hydraulic power for the linear motion axes and rotation of the plasticizing screw in an injection molding machine. When engaged, the first one-way clutch couples the drive motor to the pump stack, while the second one-way clutch couples the motor to the feed screw. During rotation of the drive motor in a forward direction; (a) the first one-way clutch engages, rotating the shaft of the hydraulic pump stack to power the machines hydraulic systems and charge the accumulator; and (b) the second one-way clutch slips. When the drive motor is rotated in a reverse direction, (a) the second one-way clutch engages, rotating the feed screw, and (b) the first one-way clutch slips. Preferably, the drive apparatus is associated with a double shaft motor mounted adjacent separate drive couplings for the feed screw and hydraulic pump stack.

3 Claims, 5 Drawing Sheets

INJECTION MOLDING MACHINE HAVING A HYDRAULICALLY OPERATED CLAMPING SYSTEM

BACKGROUND OF THE INVENTION

1. Field of the Invention

The present invention relates generally to injection molding machines and, more particularly, to an injection molding machine that uses a single electric motor to rotate the feed screw and, alternatively, drive a hydraulic pump stack.

2. Description of the Related Art

The injection unit of a typical injection molding machine provides essentially two functions during the course of a normal cycle of operation; namely, injection and extruder. The injection function occurs when the feed screw is moved forward linearly (without rotation) to force plastic melt into the mold. The extruder function is accomplished when the feed screw is rotated to plasticize additional material for the next shot. As the feed screw is rotated during the extruder function, the plastic melt is gradually forced past the end of the screw, creating a pressure or force to move the screw rearward to its pre-injection position as the melt accumulates.

Both the injection and extruder functions require an associated drive apparatus in the injection unit. In prior art hydraulic machines, the movement for the injection function is typically performed by a hydraulic cylinder, while the rotation of the feed screw for extruder run is normally accomplished by a hydraulic motor. More recently, electric motors combined with mechanical systems have been used as the direct power source in the injection unit. Some of the prior art electric systems have used separate motors for each function; i.e., one motor for rotating the feed screw and a second motor in combination with a mechanism, such as a ball screw, to convert rotary motion into the linear movement required for injection. Other prior art "hybrid" machines have used an electric motor to rotate the feed screw with the remaining functions of the machine being hydraulically driven, with power provided by an electric motor diving one or more hydraulic pumps.

While the "hybrid" machine incorporates some of the advantages of both electric (better control of screw rotation) and hydraulic (lower overall cost) machines, there remains room for improvement. In particular, there is potential for a more economical system since there is excess capacity in the electric motor that rotates the screw. This motor is only used during the portion of the cycle were the thermoplastic material is extruded (plasticated) to build the shot. Since the motor and the associated variable speed drive have a relatively high cost, it is desirable to maximize the utilization of this motor. Furthermore, for the injection molding machines with variable speed motors currently available, the motors are either dedicated to specific axes (as with electromechanical systems), or are applied to standard hydraulic circuits redundantly so that no economy of control is gained by the variable speed motor and drive.

SUMMARY OF THE INVENTION

Accordingly, it is an object of the present invention to provide a drive apparatus that is simple in construction and effectively enables a single variable speed motor to be used to provide power for a combination of mechanical and hydraulic machine elements.

Briefly stated, the present invention is directed to a drive apparatus including a variable speed motor, preferably brushless DC, and conventional power transmission components to alternately provide (a) rotation of the feed screw in the injection unit of an injection molding machine or (b) operation of a hydraulic pump stack in order to provide power to the machine's hydraulic system. The drive apparatus further includes a first one-way clutch between the motor and the feed screw, and a second one-way clutch between the motor and the hydraulic pump stack.

During operation of the most machine functions, the drive motor is rotated in a forward (clockwise) direction to rotate the input shaft of the pump stack, thereby providing hydraulic power for the operating elements in the various motion axes, such as clamp and injection. The hydraulic power from the pump stack is also used to charge a hydraulic accumulator, providing a hydraulic power reserve for intervals when the motor is not available to drive the pump. More specifically, during forward rotation of the drive motor, (a) the first one-way clutch is engaged, rotating the shaft of the pump stack; and (b) the second one-way clutch slips.

The motor is rotated in a reverse (counterclockwise) direction to accomplish the extruder function, i.e., to rotate the feed screw through a suitable transmission mechanism. In particular, during reverse rotation, (a) the second one-way clutch is engaged, rotating the feed screw via pulleys and a drive belt at a predetermined speed to plasticize material; and (b) the first one-way clutch slips.

The preferred embodiment of the drive apparatus includes a double shaft motor mounted to engage suitable power drive couplings for the feed screw and the hydraulic pump stack. Overall, the present invention provides a compact drive system for a single motor to power all machine axes; this improves reliability and allows faster response over prior art systems that require a shift mechanism to divert power to the different axes. Advantages of the preferred embodiment include: better utilization of motor capacity, improved energy efficiency, reduced overall machine cost and more accurate control of feed screw rotation.

DESCRIPTION OF THE PREFERRED EMBODIMENT

Figure 1:
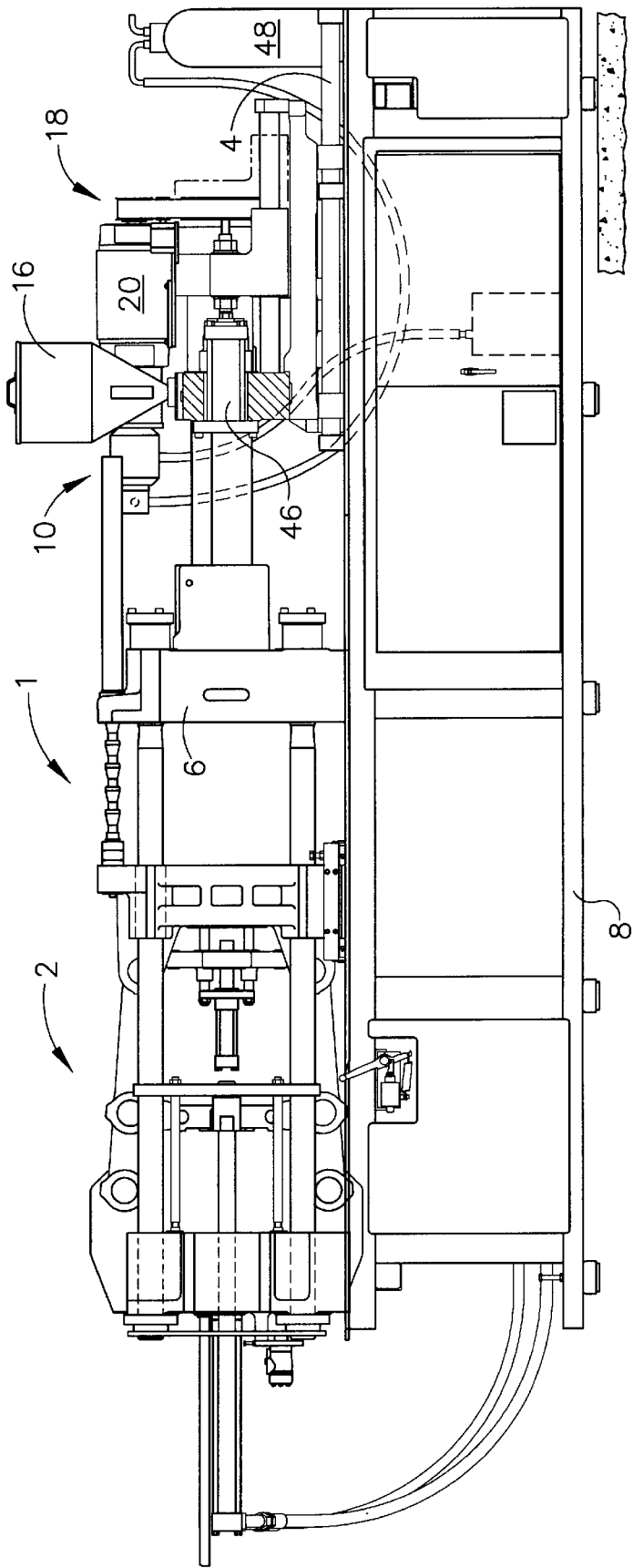
FIG. 1 is a side elevational view of an injection molding machine, including a drive apparatus according to the present invention.
Figure 4:
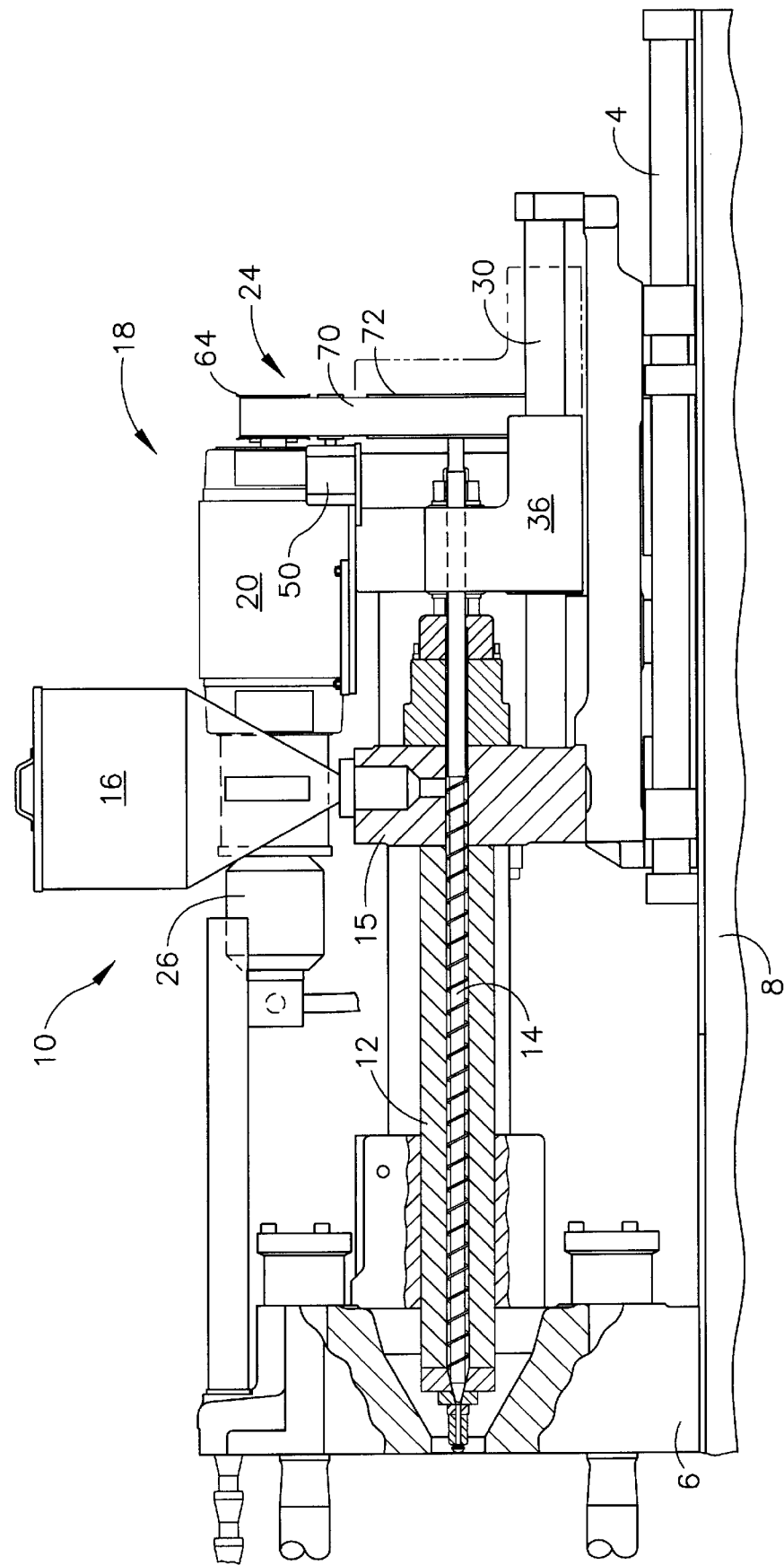
FIG. 4 is an enlarged, fragmentary side elevational view, partially in section, taken along the line 4—4 in FIG. 3.

The present invention will be described in connection with a typical injection molding machine 1 that includes a clamping system 2 and an injection unit 10. As shown in FIG. 1 and 4, the injection unit 10 is carried by horizontal support rods 4 attached to a base 8 of the injection molding machine 1. The injection unit 10 is adapted to move along the support rods 4 for purposes of positioning, such as making connection with a mold (not shown) attached to stationary platen 6.

Figure 2:
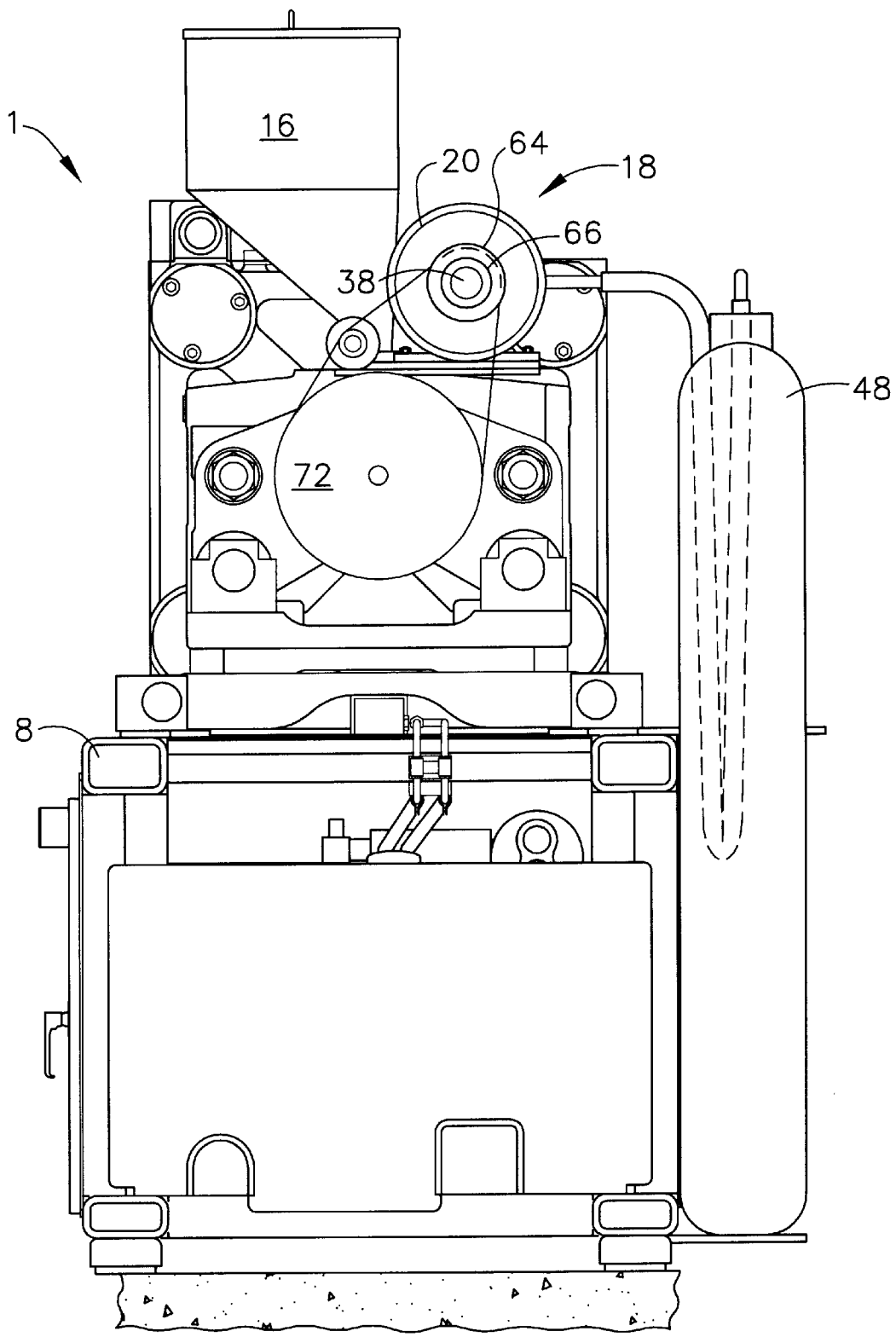
FIG. 2 is a right end elevational view of the injection molding machine illustrated in FIG. 1.
Figure 3:
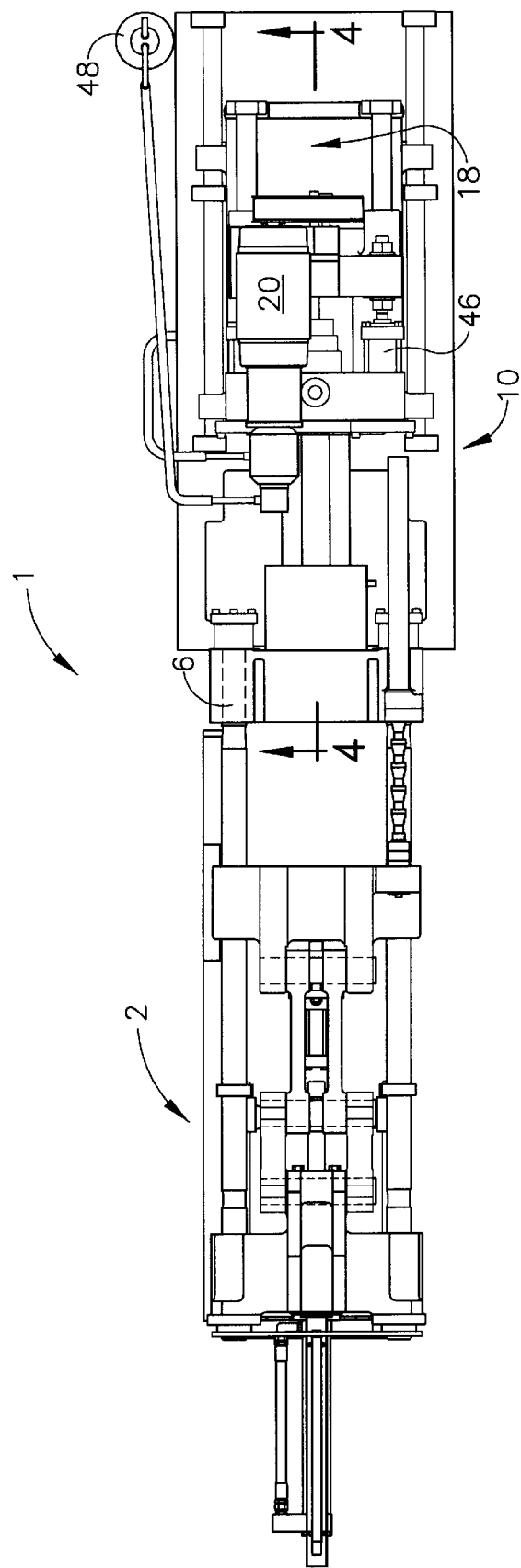
FIG. 3 is a top plan view of the injection molding machine illustrated in FIG. 1.

The primary components of the injection unit 10 include a barrel 12 containing a feed screw 14 (FIG. 4) that works to plasticize thermoplastic material that enters the barrel 12 through housing 15 from hopper 16. The operative functions of the injection molding machine 1, including the injection unit 10, are initiated by a drive assembly 18. The drive assembly 18 of injection unit 10 includes an electric drive motor 20, pump drive coupling 22, extruder drive coupling 24, hydraulic pump stack 26 and support housing 28, see FIGS. 2 and 4. As will be described in greater detail in the following paragraphs, the drive assembly 18 operates to rotate the feed screw 14 to plasticize the material during the extruder function, and to generate the hydraulic power required for the other machine functions.

Figure 5:
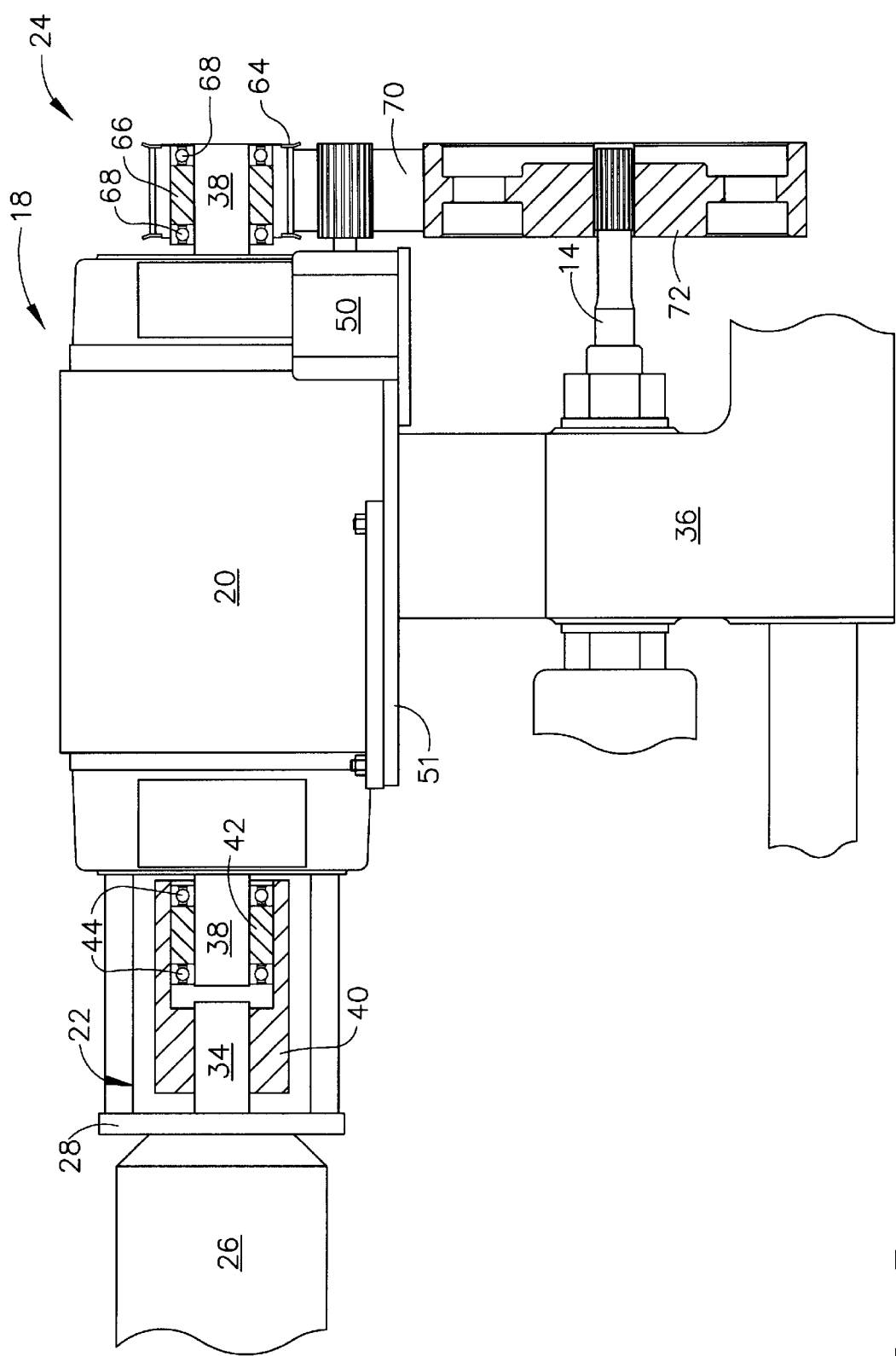
FIG. 5 is an enlarged, fragmentary view, partially in section, of the drive apparatus shown in FIG. 4, with certain parts removed for clarity.

Referring more particularly to FIG. 5, the drive assembly 18 includes a pump drive coupling 22 that connects the motor 20 to the hydraulic pump stack 26. Mounted on the shaft 38 of motor 20 are a one-way clutch 42 and two ball bearing assemblies 44, which collectively serve to support and engage a connector sleeve 40 that attaches directly to the shaft 34 of the pump stack 26. As will be more fully described later, while the motor 20 is capable of rotation in either direction, the one-way clutch 42 acts to allow rotation of the connector sleeve 40 in one direction only. In the context of this disclosure, each element described as a "one-way clutch" is preferably a mechanical cam type clutch made to engage a rotating cylindrical element with a surrounding member for one direction of rotation; there is essentially no resistance from the clutch when the element is rotated in the opposite direction. Morse Industrial, Emerson Power Transmission Corp. is a well known supplier of this type of clutch.

A motor mounting plate 51 connects directly to a support housing 36 and is configured to travel with the support housing 28 along the guide rods 30. As shown, the motor 20 sits directly on top of the mounting plate 51.

The drive assembly 18 also includes an extruder drive coupling 24 to connect the motor 20 to the feed screw 14. In a manner similar to that described above for the pump drive coupling 22, the extruder drive coupling 24 includes a pulley 64 mounted on motor shaft 38 through a one-way clutch 66 and bearings 68. A second pulley 72 in extruder drive coupling 24 connects to the feed screw 14 and is driven by pulley 64 through a drive belt 70.

The operation of the drive assembly 18 will now be described. To initiate the extruder function, motor 20 is activated to rotate in a counterclockwise direction. This rotation of motor shaft 38 causes one-way clutch 66 to engage, driving pulley 64 and, consequently, pulley 72 by virtue of drive belt 70. The rotation of pulley 72 imparts like rotation to the feed screw 14. As the feed screw 14 is rotated, material supplied from hopper 16 feeds through housing 15 and is plasticized within barrel 12. The rotation of feed screw 14 also serves to advance material toward the nozzle (discharge) end of barrel 12, causing the pressure of the melt to increase at the end of the screw 14 as the charge of material begins to accumulate. When the pressure of the plastic melt reaches a certain level, it will begin to force feed screw 14 rearward, thereby moving the entire drive assembly 18 to the rear of injection unit 10. Specifically, the rearward movement of feed screw 14 applies a force to housing 36, causing housing 36 to move likewise to the rear, carrying motor 20, pump stack 26 and associated drive components.

The rate of rearward movement of the feed screw 14 can be controlled by the hydraulic cylinders 46 connected to either side of the housing 36 (see FIG. 1). The appropriate valving of the fluid in the cylinders 46 can slow the rearward movement (but not the rotation) of the feed screw 14, thereby increasing the back pressure of the plastic melt. Alternatively, the hydraulic cylinders 46 can be used to apply force on the housing 36 in a way that increases the rate at which the feed screw moves back, thereby decreasing the back pressure of the melt.

As the motor 20 rotates in a counterclockwise direction during the extruder function, the one-way clutch 42 slips on shaft 38 so that no rotational force is transmitted to the pump shaft 34. The extrusion function is complete when a sufficient charge of plastic melt is accumulated in front of the feed screw 14, as required to fill the cavity of the mold mounted on the stationary platen 6.

As soon as the extrusion function is complete, the motor 20 is reversed so that it rotates in a clockwise direction; as a result, one-way clutch 42 is engaged on shaft 38, rotating connector sleeve 40 and shaft 34 of the hydraulic pump stack 26. The hydraulic energy generated by the pump stack 26 is used to operate machine functions and/or charge a hydraulic accumulator 48, as determined by the operating sequence of the injection molding machine 1. For example, to perform the injection function, hydraulic energy is directed via suitable valving (not shown) to the hydraulic cylinders 46; the cylinders operate to impart a translational (linear) movement to the feed screw 14 by applying a force to the housing 36.

The forward movement of feed screw 14 causes the plastic melt accumulated at the end of the barrel to be forced out of the barrel and into the mold cavity. During injection, a braking motor 50 is energized to impart sufficient force to the drive belt 70 to keep the feed screw 14 from rotating in a clockwise direction when the feed screw 14 is moved forward to inject the plastic melt. (The force of the plastic melt on the flight of the feed screw 14 creates a torque that tends to rotate feed screw 14.) Upon completion of the injection function, the cylinders 46 are used to maintain pressure on the plastic melt ("pack and hold") to ensure that the part is properly formed.

At the beginning of the pack and hold interval, the motor 20 reverses rotation to begin another extrusion function as described previously. The accumulator 48 provides the hydraulic energy required to maintain operation of the cylinders 46 while the motor 20 is rotating the feed screw. Similarly, the accumulator 48 would provide the hydraulic energy to open the mold after pack and hold is complete. Depending on the duration of the extrusion operation, the hydraulic energy required to operate the eject system and/or close the clamp system in preparation for injection, is supplied by the accumulator 48 and/or pump stack 26 as required by the components of the injection molding machine 1.

While the invention has been illustrated in some detail according to the preferred embodiment shown in the accompanying drawings, and while the preferred embodiment has been described in some detail, there is no intention to thus limit the invention to such detail. On contrary, it is intended to cover all modifications, alterations, and equivalents falling within the spirit and scope of the appended claims. For example, although the drive couplings are generally described as belts and pulleys, other mechanical couplings, such as suitable gearing, can be used to perform the same function.

What is claimed is:

1. An injection molding machine comprising a hydraulically operated clamping system, an injection unit including a feed screw capable of rotational and translational movement within a barrel, a hydraulic pump, a variable speed electric drive motor, and transmission means for alternately transmitting power from the drive motor to (a) rotate the feed screw and (b) activate the hydraulic pump, such that operation of the drive motor in one direction rotates the feed screw to plasticize material in the barrel of the injection unit and operation of the drive motor in an opposite direction activates the hydraulic pump to enable operation of the clamping system and translational movement of the feed screw within the barrel of the injection unit.

2. The injection molding machine of claim 1 wherein the transmission means comprises:

(a) a first one-way clutch interposed between the drive motor and the hydraulic pump, and (b) a second one-way clutch interposed between the drive motor and the feed screw, such that when the drive motor is operated in a forward direction, (i) the first one-way clutch is engaged to operate the hydraulic pump thereby generating hydraulic power to operate the clamping system and initiate translational movement of the feed screw, and (ii) the second one-way clutch slips;

when the drive motor is operated in a reverse direction, (iii) the second one-way clutch is engaged, rotating the feed screw, and (iv) the first one-way clutch slips.

3. A molding machine having a hydraulically operated clamping system, an injection unit including a feed screw rotatably and translatably carried in a barrel, a hydraulic pump, a variable speed electric drive motor, and transmission means for alternately transmitting power from the drive motor to the feed screw and hydraulic pump, the transmission means comprising:

(a) a first one-way clutch interposed between the drive motor and the hydraulic pump, (c) a second one-way clutch interposed between the drive motor and the feed screw, such that when the drive motor is operated in a forward (pump) direction, (i) the first one-way clutch is engaged to operate the hydraulic pump thereby generating power to operate the clamping system and translational movement of the feed screw, and (ii) the second one-way clutch slips;

when the drive motor is operated in a reverse (extrusion) direction, (iii) the second one-way clutch is engaged, rotating the feed screw, and (iv) the first one-way clutch slips.

* * * * *